(No Model.)

W. M. LEVERING.
EXPANSIBLE BOLT.

No. 525,222. Patented Aug. 28, 1894.

WITNESSES:
P. F. Eagle.
L. Douville.

INVENTOR
William M. Levering
BY
John A. Diebersheim
ATTORNEY

UNITED STATES PATENT OFFICE.

WILLIAM M. LEVERING, OF PHILADELPHIA, PENNSYLVANIA.

EXPANSIBLE BOLT.

SPECIFICATION forming part of Letters Patent No. 525,222, dated August 28, 1894.

Application filed April 16, 1894. Serial No. 507,683. (No model.)

*To all whom it may concern:*

Be it known that I, WILLIAM M. LEVERING, a citizen of the United States, residing in the city and county of Philadelphia, State of Pennsylvania, have invented a new and useful Improvement in Expansible Bolts, which improvement is fully set forth in the following specification and accompanying drawings.

My invention relates to an improvement in an expanding or expansible bolt which is adapted to be retained within a piece of stone or other desired material, the same consisting of a sleeve which is slotted or divided throughout its entire length, a conical nut which may be inserted in either end of said sleeve, and a bolt which is passed through the sleeve and screwed into the nut, the latter being formed with a spline which enters the slot, the nut being primarily fitted into the desired end of the sleeve, so that the former may be carried by the latter and inserted in the opening the device is to occupy, as will be hereinafter more fully set forth.

Figure 1:
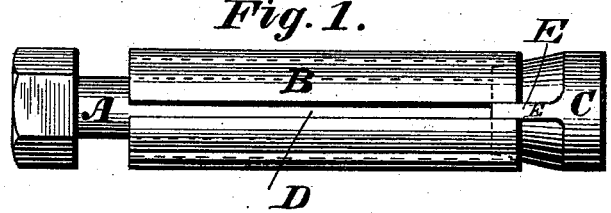
Figure 2:
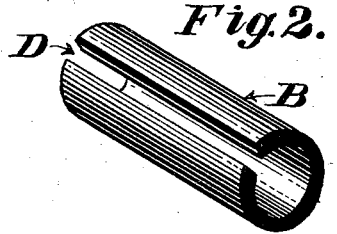
Figure 3:
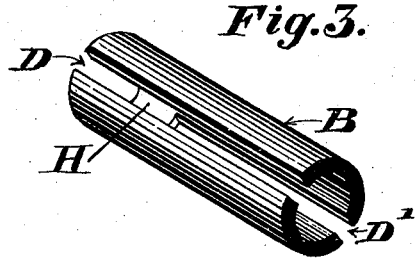
Figure 4:
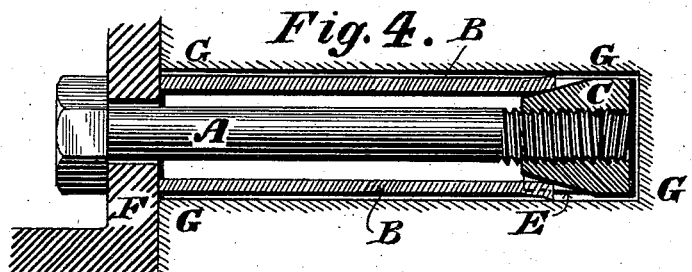
Figure 5:
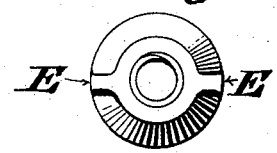
Figure 6:
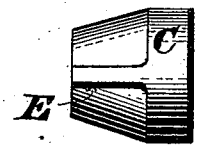

Figure 1 represents a side elevation of an expansible bolt embodying my invention. Figs. 2 and 3 represent perspective views of the sleeves employed. Fig. 4 represents a longitudinal section of the device. Figs. 5 and 6 represent respectively end and side views of the nut.

Similar letters of reference indicate corresponding parts in the several figures.

Referring to the drawings: A designates a bolt which enters the sleeve B, and engages with the conical nut C, said sleeve being longitudinally split, divided or slotted as at D. On the side of the nut is a spline E, which is adapted to enter the slot D, as shown in Figs. 1 and 4.

Fitted on the bolt is a bracket or plate F, which occupies a position between the head of the bolt and the front wall of the opening G of the stone in which the sleeve and nut are fitted. The sleeve is split or slotted, or divided on opposite sides as at D, D', excepting at the portion H, which latter forms a neck for connecting the sections of the sleeve and preserving the latter intact. In this case the nut has a spline E at opposite places so that each slot receives a spline, as will be evident on reference to Fig. 5.

The operation is as follows: The nut is partly introduced into the rear end of the sleeve, the spline E entering the slot D. The sleeve with the nut may now be inserted in the opening G, the latter being of slightly larger diameter than said sleeve and nut, and said sleeve is driven back or into the opening, so that the conical portion of the nut presses against the inner wall of the sleeve, thus expanding the same and causing it to tightly hug the wall of the opening G, whereby it cannot be withdrawn. The bracket is now fitted on the bolt and the latter introduced in the sleeve and screwed into the nut, whereby the bracket is fully held in position.

Should it be desired to remove the sleeve, the bolt is entirely unscrewed, and the neck H grasped by a hook or suitable implement, and thus the sleeve may be withdrawn, as is evident.

It will be noticed that as the slot D extends the entire length of the sleeve, either end of the latter is adapted to receive the nut and be expanded by the same.

Having thus described my invention, what I claim as new, and desire to secure by Letters Patent, is—

1. In an expansible bolt, a sleeve having a longitudinal slot extending a portion of the length thereof, and a neck at the end of said slot forming an integral portion of the wall of said sleeve, a bolt entering said sleeve, and a conical nut on the threaded end of said bolt having a spline on its side interlocking with the end of the sleeve, the body of the nut contacting with the inner wall of the sleeve adjacent to said spline, the parts being combined substantially as described.

2. An expansible bolt consisting of a sleeve having a division extending the entire length thereof, and a slot extending a portion of the length thereof, a connecting neck at the end of the latter division forming an integral part of the wall of the sleeve, a bolt with a threaded end, and a conical nut with a spline on its side, guided in said division and slot, said parts being combined substantially as described.

WILLIAM M. LEVERING.

Witnesses:
EUGENE R. SHINN,
HARRY U. DANAU.